United States Patent [19]

White et al.

[11] 4,168,336

[45] Sep. 18, 1979

[54] WEDGE FOR TIRE BEAD ASSEMBLY APPARATUS

[75] Inventors: John R. White, Wadsworth; Robert A. Lammlein, Akron, both of Ohio

[73] Assignee: The Goodyear Tire & Rubber Company, Akron, Ohio

[21] Appl. No.: 869,560

[22] Filed: Jan. 16, 1978

[51] Int. Cl.² ............................................. B29H 17/32
[52] U.S. Cl. ..................................... 428/65; 156/401; 156/422; 156/460; 428/66; 428/310; 428/425
[58] Field of Search .................. 428/65, 66, 310, 315, 428/425; 156/123 R, 132, 136, 398, 400–403, 460, 422

[56] References Cited

U.S. PATENT DOCUMENTS

| | | | |
|---|---|---|---|
| 3,185,607 | 5/1965 | Nebout | 156/401 |
| 3,256,132 | 6/1966 | Williams | 428/315 |
| 3,816,233 | 6/1974 | Powers | 428/315 X |
| 3,895,986 | 7/1975 | Komatsu et al. | 156/136 |
| 4,087,298 | 5/1978 | Mangun et al. | 156/136 |

*Primary Examiner*—John E. Kittle
*Attorney, Agent, or Firm*—H. C. Young, Jr.

[57] ABSTRACT

An annular wedge suitable for use in a tire bead assembly preparation apparatus. The annular, resilient, flexible, compressible wedge has a generally T-shaped axial cross-section with an outer head portion, an inner trunk portion and an inner-connecting throat portion with a generally triangular cross-section therebetween, and a continuous reinforcing annular textile fabric strip integral with said head, throat and trunk portions, said wedge being of a continuous structure having a core of especially prepared microcellular polyurethane and an outer densified relatively smooth skin.

10 Claims, 4 Drawing Figures

U.S. Patent     Sep. 18, 1979     4,168,336
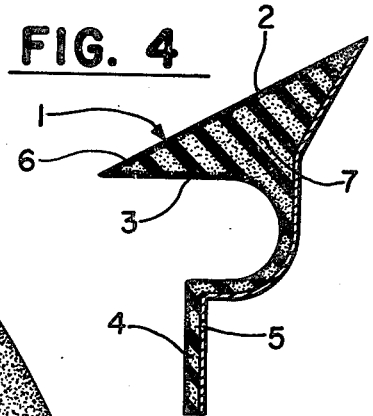
FIG. 4
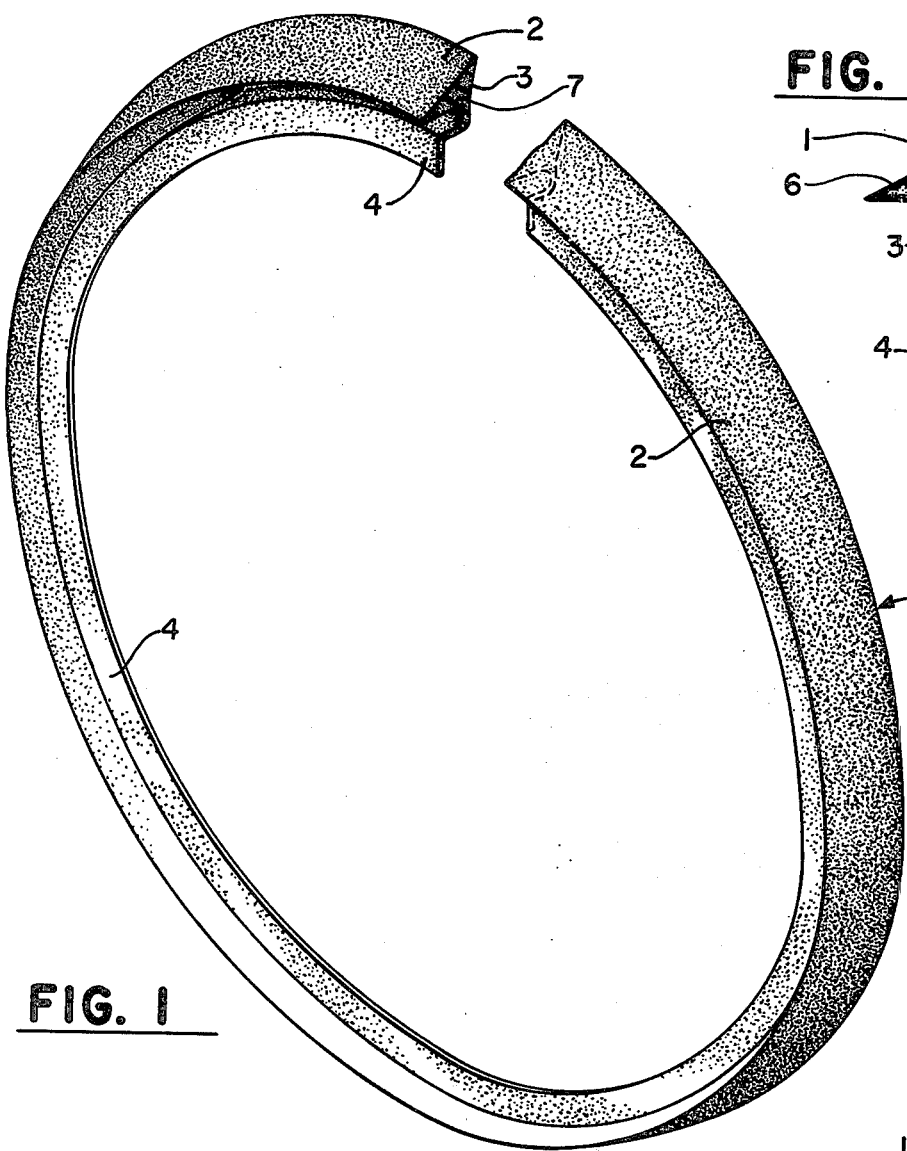
FIG. 1
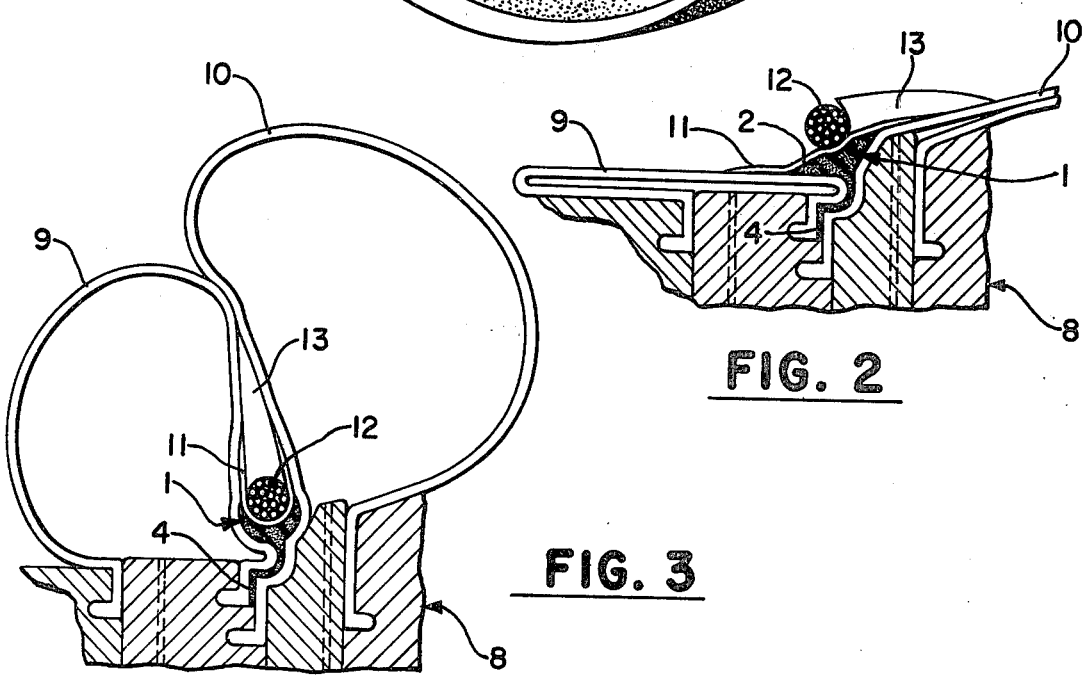
FIG. 2
FIG. 3

WEDGE FOR TIRE BEAD ASSEMBLY APPARATUS

This invention relates to the manufacture of tires. It particularly relates to a functional wedge, gasket or bridging element suitable for use in a tire bead assembly apparatus.

Pneumatic rubber tires, particularly of the tubeless type, are used for transportation vehicles. Such tires are typically comprised of a ground contacting tread portion, spaced beads for securing the tire on a centered, rigid rim, connecting sidewalls extending radially from the tread portion to the beads, and a supporting carcass for the tread and sidewalls normally containing fabric ply reinforcing members and normally having an inner air barrier layer.

This invention is more narrowly directed to a functional wedge useful in an apparatus for building a bead assembly portion of such a tire.

In the manufacture of pneumatic rubber tires, an apparatus separate from the tire building apparatus can conveniently be used for the preparation of the bead assembly. The prepared bead assembly is then transferred to the tire building apparatus. Such a bead assembly is generally a structure comprised of an inextensible wire bead core, a rubber apex and a rubber gum strip. It is generally desired that such an assembly be formed as an integral unit which can be readily built into a carcass in a conventional tire building machine. In this regard, it is desired that the bead assembly be essentially free of wrinkles or inclusion of air pockets, particularly at the interfaces between its bead, gumstrip and apex elements, and that the assembly itself have a shape adapted to being fitted with the tire carcass during the subsequent tire building operation.

The bead can be described as a bundle of wires bound together in the form of a ring. The purpose of the bead in a pneumatic tire is to provide an anchoring means with dimensional stability to enable a secure fitting, attachment or mounting of the tire itself to a centered rigid rim.

The apex can be described as a generally triangular cross sectioned annular compounded rubber with its base attached and secured circumferentially to the bead and, in the final tire construction, having its apex extending into its sidewall portion.

The gum strip typically used in the bead assembly is conveniently a thin, compounded rubber strip, adhered to and covering the portion of the bead not adhered to the apex and extending to and overlapping both sides of the apex rubber directly adjacent to its base portion.

Heretofore, the bead assembly has been prepared, for example, by first positioning two collapsed, expandable, annular bladders adjacent to each other, in somewhat of a horizontal plane, although the second collapsed bladder can be inclined up to 40° from the horizontal to the other. Usually it is desired that the second collapsed bladder is inclined from 10° to 30° from the plane of the first collapsed bladder. Then, a thin rubber gum strip is wrapped around to abridge the narrow gap between and overlap the two bladders. The annular metal bead is fitted over the gum strip and the triangular cross-sectioned annular apex is laid against the second collapsed bladder and its base pressed against the bead. Then, the bladders are inflated with air to cause them to expand and force the apex and gum strip securely around the metal cord.

Serious disadvantages have occurred during and/or resulting from such an assembly procedure, particularly involving resultant wrinkles in the outer gum strip as well as trapped air between the bead, apex and gum strip interfaces, apparently caused by the crevice and/or parting line between the bladders.

In accordance with this invention, an annular, resilient, flexible compressible wedge, in the form of a ring, is provided having a generally T-shaped axial cross-section with an outer head portion, an inner trunk portion and an inner-connecting throat portion therebetween having a generally triangular cross-section, and a continuous reinforcing textile fabric strip integral with said head, throat and trunk portions, said wedge being of a continuous structure having a core of a microcellular polyurethane and an outer densified relatively smooth skin and said wedge being suitable for forming a bridge across the narrow gap formed between two juxtapositioned expandable, collapsed, annular bladders, with its trunk and throat portions fitting therebetween, its trunk portion affixed to a rigid support, and its head portion overlapping them to form a continuous outer surface.

The thereby positioned wedge is further suitable for forming or fitting together a tire bead assembly comprised of an annular inextensible bead, an annular, triangular cross-sectioned apex and an annular, relatively flat rubber gum strip by the method which comprises (A) positioning the wedge between two collapsed, inflatable bladders with its trunk and throat portions fitting therebetween, its trunk portion affixed to a rigid support and its head portion overlapping the bladders to form a continuous outer surface, (B) applying a flat, annular compounded rubber gum strip circumferentially over the outer surface of the head of the wedge and overlapping the bladders.

(C) forcibly positioning an annular, inextensible bead against the said gum strip to force an indentation thereof and a corresponding partial compression of the said wedge, (D) positioning an annular, generally triangular cross-sectioned compounded rubber apex with its base pressed against the positioned bead, and (E) inflating the collapsed bladders to cause their expansion and corresponding shaping the gum strip around the bead and overlapping the sides of the apex adjacent to its base and thereby form the said bead assembly.

It is important to appreciate that it is the wedge of this invention which has, in such a method of assembling, enabled the preparation of a pneumatic tire bead assembly without the otherwise attendant trapped air pockets at the interfaces of its elements. At large measure, the invention resides in providing such a wedge with its required flex, resiliency and compression physical characteristics in order that the bead is properly impressed against the wedge and that the wedge subsequently is distorted while the bladders are inflated and expanded, to forcibly put the assembly together.

In these regards, it is required that the microcellular polyurethane of the wedge has sufficient strength to flex in the range of 100,000 to 200,000 cycles before failure, according to ASTM test #D 1052-55 on the Ross flexing machine and that it have less than a 10 percent compression set according to ASTM D 2406 where the test is conducted for 72 hours at 50 percent compression at 23° C. It is further desired that the microcellular polyurethane be characterized by having a Shore A hardness in the range of about 20 to about 40, preferably about 25 to about 35, and having a sufficient microcellular structure to reduce the basic polyurethane's specific gravity at 25° C. about 50 to about 70 percent, preferably about 50 to about 60 percent.

In the practice of this invention, the wedge is prepared by reacting in a suitable mold, (A) about 30 to about 50, preferably about 35 to about 45, parts by weight of a quasi-prepolymer having about 15 to about 25, preferably about 18 to about 24, weight percent free NCO which has been prepared by reacting a diisocyanate with at least one polyol selected from at least one of tripropylene glycol, polyester polyol with a hydroxyl functionality of about 2 and a molecular weight in the range of about 1000 to about 2000, polytetramethylene ether glycol having a molecular weight in the range of about 1000 to about 2000, and a triol capped polyalkylene ether polyol having hydroxyl functionality in the range of about 2.5 to about 2.9 and a molecular weight in the range of about 3000 to about 6000, said triol containing 4 to 8 carbon atoms and said polyalkylene ether polyol derived from alkylene oxides or glycols containing 2 to 4 carbon atoms with (B) 100 parts by weight of a mixture comprised of (1) about 90 to about 98, preferably about 92 to about 96, weight percent of at least one polymeric polyol selected from at least one of polyester polyol having a hydroxyl functionality of about 2 and a molecular weight in the range of about 1000 to about 2000 polytetramethylene ether glycol having a molecular weight in the range of about 1000 to about 2000 and triol capped polyalkylene ether polyol having a hydroxyl functionality in the range of about 2.5 to about 2.9, and a molecular weight in the range of about 3000 to about 6000, said triol containing 4 to 8 carbon atoms and said polyalkylene ether polyol derived alkylene oxides or glycols containing 2 to 4 carbon atoms, (2) about 2 to about 10, preferably about 4 to about 8, weight percent of a hydroxyl terminated monomeric diol selected from at least one of ethylene glycol, 1,4-butane diol, diethylene glycol, 1,3-propane diol, 1,5-pentane diol, 1,6-hexane diol, $\beta$-hydroxyl ethyl-$\beta$-hydroxylethyl carbamate, and dipropylene glycol, and (3) a blowing agent.

Optionally, along with the (B) components, a catalyst can be used, such as an organotin catalyst, for example, dibutyltin dilaurate, stannous octoate, and tin mercaptide; or tertiary amine, such as triethylene diamine and tetramethyl butane diamine.

In the preparation of the wedge for use in the tire bead assembly machine, it is seen that a quasi-prepolymer method is required to be used to prepare the polyurethane. For the quasi-prepolymer technique, a first polymer is prepared having an excess of diisocyanate or, in other words, a substantial deficiency in hydroxyl groups. Then, the polymer is completed by reacting with selected hydroxyl containing compounds.

In this regard, the term "weight percent free NCO" means the weight percent of free, unreacted NCO groups in the quasi-prepolymer based on the prepolymer plus unreacted diisocyanate.

In the practice of this invention, various diisocyanates can be used, representative of which are diphenylmethane-4,4'-diisocyanate, the 2,4- and 2,6-diisocyanates and their mixtures, 3,3'-bitolylene-4,4-diisocyanate, isophorone diisocyanate, 3,3'-dimethyldiphenylmethane-4,4'-diisocyanate, 1,5-naphthylene diisocyanate. Particularly preferred is the diphenylmethane-4,4'-diisocyanate.

In the practice of this invention, various polymeric polyether polyols can be used representative of which are polytetramethylene ether glycol and polyether polyols prepared by reacting at least one alkylene oxide, such as ethylene oxide and propylene oxide with a triol initiator having 3 to 8 carbon atoms to produce a polyether polyol having a hydroxyl functionality in the range of about 2.5 to about 2.9. Representative of suitable triol initiators are, for example, glycerine and trimethylol propane.

Representative of various polymeric polyester polyols are the type obtained from the reaction product of dicarboxylic acids having 4 to 10 carbon atoms and hydroxyl terminated hydrocarbon diols having 2 to 8 carbon atoms. Representative of such acids are succinic acid, glutaric acid, adipic acid, phthalic acid, terephthalic acid, isophalic acid, sebacic acid and azelaic acid. Representative of such diols are ethylene glycol, propylene glycol, butylene glycol, pentylene glycol, decamethylene glycol, etc. Adipic acid and 1,4-butane diol are preferred.

In the practice of this invention, it is necessary that, as the polyurethane reaction proceeds within the mold, the mixture is expanded or blown and essentially simultaneously a skin of densified microcellular structure is formed on its outer surface. In order to accomplish this effect, the said monomeric diol is necessary in the recipe as well as a small amount of blowing agent. With regard to the blowing agent, it is desired that it be liquid in nature at about room temperature in order to aid the fluidity of the mixture and that it convert to a gas upon heating during the actual reaction. Typically, about 5 to about 15 weight percent, based on the total reaction mixture, blowing agent is used depending primarily upon the degree of microcellular structure or specific weight reduction desired.

Representative of such blowing agents are methylene chloride, trichloromonofluoromethane, dichlorodifluoromethane, and 1,2-dichlorotetrafluoroethane. A small amount of water is also often used to cause the generation of a small amount of carbon dioxide.

The annular wedge of this invention is conveniently prepared by pouring or injecting the liquid polyurethane reaction mixture into an enclosed but vented mold cavity under atmospheric pressure or slightly above atmospheric pressure, such as in the range of about atmospheric to about 10 pounds per square inch (psig) or about atmospheric to about 35 or 70 kPa. The mixture is then reacted, expanded and cured, generally, under an autogeneous pressure developed by the reaction in the mold which is commonly in the range of about 10 to about 50 psig.

The polyurethane is made by first preparing an isocyanate terminated quasi-prepolymer by reacting the diisocyanate and at least one of the tripropylene glycol or said polyester polyol. The polyester polyol itself has a hydroxyl functionality of about 2. The quasi-prepolymer typically has a viscosity at 25° C. in the range of about 700 to about 1500 cps. The quasi-prepolymer is prepared by reacting the diisocyanate and polyol such that the ratio of isocyanate groups to hydroxyl groups of the polyol is in the range of about 3/1 to about 7/1, preferably about 4/1 to about 5/1. Therefore, the quasi-prepolymer is clearly isocyanate terminated. These materials are generally reacted at temperatures in the range of about 30° C. to about 100° C.

The quasi-prepolymer is then extended by reacting with a mixture of polyether polyol and monomeric hydroxyl terminated diol at about 20° C. to about 120° C. Polymeric polyol and monomeric diol extender mixture is used in a ratio of about 0.5/1 to about 1.5/1, preferably about 0.8/1 to about 1.15/1 hydroxyl groups of the extender for each excess or unreacted isocyanate terminated quasi-prepolymer.

Representative of the preferred extenders are the said polyether polyols prepared by polymerizing or copolymerizing ethylene oxide and/or propylene oxide with a triol initiator. The preferred monomeric diol extender for the extender mixture is at least one of 1,4-butane diol, β-hydroxy ethyl-β-hydroxyethylcarbamate and ethylene glycol.

The woven textile fabric reinforcement is an important and necessary feature of the wedge of this invention for it to be successfully operational. It can be of various textile fabrics prepared from various yarns and continuous filaments by processes known to those having skill in the art. An open weave is desirable. Various materials can be used for the woven fabrics, representative of which are linear polyamides, such as the various nylons including nylon 6 and nylon 66, aromatic nylons, such as p-aminobenzoic acid polymer (p-abap), such as described in French Pat. No. 1,526,745, sometimes known as polyaramides, linear polyesters, such as, for example, polyethylene terephthalate and cellulose and cellulose derivatives such as cotton and rayon. Wire and glass woven fabric can also be used if desired.

The objects and advantages of this invention become more readily apparent and more readily understood by reference to the accompanying drawings, where FIG. 1 is a perspective view of the annular wedge having a cut-away portion showing its cross-section, FIG. 2 is a side elevational view of a portion of a tire bead assembly apparatus showing the placement of the wedge and assembly.

FIG. 3 is a cross-sectional view of a portion of a tire bead assembly apparatus with its bladders expanded, showing the prepared bead assembly therein, along with the deformed wedge of this invention and FIG. 4 is a cross-sectional view of the wedge.

Reference to the drawings shows the general shape of the annular wedge 1 with its outer head portion 2 having its smooth surface, its connecting throat portion 3 and supporting trunk portion 4, as well as the reinforcing textile fabric strip 5 extending from the trunk through the throat to the head. As it can readily be seen, the wedge 1 itself has a thin skin 6 which encapsulates its microcellular body 7.

Further reference to the drawings shows the placement of the wedge 1 in a tire building apparatus 8 between two juxtapositioned, annular collapsed, expandable bladders 9 and 10, with its head portion 1 overlapping them and forming a continuous surface. Its throat and trunk portions 3 and 4, are positioned between the bladders and the trunk portion 4, with its fabric reinforcement 5, fixed such as by clamping to a rigid support. Over the wedge 1 is placed an annular compounded rubber gum strip 11. An annular wire bead 12 is then forcibly impressed against the gum strip 11 which causes it to deform and cause an indentation of both the gum strip 11 and the wedge 1. To the bead 12 is then attached the base of an annular, generally triangular shaped cross-sectioned compounded rubber apex 13.

Further inspection of the drawings and in particular FIG. 3, shows the bead assembly being prepared by the apparatus utilizing the wedge of this invention. In this regard, FIG. 3 shows the bladders 9 and 10 having been expanded which has forced the gum strip 11 securely around the bead and has adhered it to the sides of the apex 13 adjacent to its base. Indeed, during the formation of the bead assembly, the wedge is kept under a degree of compression, providing resistance, thereby conforming to the shape of the bead and eliminating entrapped air.

During this process of expanding the bladders 9 and 10, the wedge 1 has provided a continuous surface between the expanded bladders and, by the nature of the bead 12 being impressed against the gum strip to compress the wedge, has essentially remedied the heretofore problem of entrapped air between the interfaces of the elements of the bead assembly.

The practice of the invention is further illustrated by the following examples which are representative rather than restrictive of the invention scope. Unless otherwise indicated, parts and percentages are by weight.

EXAMPLE 1

An annular wedge having the general shape and cross section of FIG. 1, namely, generally having a T-shaped triangular cross section, with an outer diameter of about 22 inches (56 cm) and the width of the bead of the T being about one inch (2.5 cm), and the distance from the outer head portion to the extent of its trunk portion being about one inch (2.5 cm), and with the plane of the head portion being generally inclined to the trunk portion about 115° to 120° was prepared by the following method.

A liquid reaction mixture was prepared according to the recipe of Table 1. In this regard, components 1 through 8 were first mixed together as a master batch. The master batch and component 9 were then simultaneously fed to a foam mixing head (Admiral Machine XXX) and mixed and dispensed thereto into a suitable shaped mold. The mixture was cured for about 10 minutes at a temperature of about 140° F. (66° C.) to produce the annular wedge.

An annular open weave, nylon textile fabric was positioned in the mold prior to injecting the liquid reaction mixture and, upon curing the mixture, formed an integral reinforcing fabric extending from the trunk to the head portion of the wedge.

Table 1

| | Formulation | Parts by Weight |
|---|---|---|
| 1. | Polypropylene oxide capped with a triol initiator (6000 m.w.) | 94 |
| 2. | 33% Triethylene diamine in dipropylene glycol | 0.25 |
| 3. | Dibutyltin dilaurate | 0.02 |
| 4. | Organotin catalyst | 0.02 |
| 5. | Orange pigment | 1.0 |
| 6. | 1,4-butane diol | 6 |
| 7. | Trichloromonofluoromethane | 6 |
| 8. | Water | 0.25 |
| 9. | Isocyanate terminated polyether quasi-prepolymer* | 36 |

*Polymer of diphenylmethane 4,4'-diisocyanate with tripropylene glycol having a free NCO content of about 23 percent.

Quarter inch thick samples of microcellular polyurethane prepared according to this recipe was found to flex between 100,000 and 200,000 according to ASTM method D-1052-55 and to have a compression set of less than 10 percent according to ASTM D-2406 (72 hours at 50% compression at about 23° C.)

Specific gravity by water displacement at about 23° C. was determined to be about 0.4.

A wedge sample was tested for Shore A hardness and found to have a value of about 30.

The wedge of this example was successfully tested in a pneumatic tire bead assembly apparatus, sometimes known as a pneumat apex-applying machine, where the bead assembly consisted of a bead, apex and gum strip as hereinbefore described in this specification.

In the practice of this invention, it is generally desired that the plane of the head is inclined about 110° to about 135° to the general plane of its trunk in order to facilitate its positioning between juxtapositioned inflatable bladders themselves generally positioned at somewhat different levels, or planes, to each other. This can conveniently be seen in FIGS. 1-4.

While certain representative embodiments and details have been shown for the purpose of illustrating the invention, it will be apparent to those skilled in this art that various changes and mofidications may be made therein without departing from the spirit or scope of the invention.

What is claimed is:

1. An annular, resilient, flexible compressible wedge, in the form of a ring, having a generally T-shaped axial cross-section with an outer head portion, an inner trunk portion and an inner-connecting throat portion therebetween, said throat portion having a generally triangular cross-section and a continuous reinforcing annular textile fabric strip integral with and extending from the trunk through the throat to the head, said wedge being of a continuous structure having a core of a microcellular polyurethane and an outer densified relatively smooth skin and said wedge being suitable for forming a bridge across the narrow gap formed between two juxtapositioned expandable, collapsed, annular bladders, with its trunk and throat portions fitting therebetween, its trunk portion affixed to a rigid support, and its head portion overlapping the bladders to form a continuous outer surface where said microcellular polyurethane has less than a 10 percent compression set according to ASTM D 2406 where the test is conducted with a 50 percent compression for 72 hours at about 23° C., where it has a Shore A hardness in the range of about 20 to about 40, and where it has a sufficient microcellular structure to reduce the basic polyurethane's specific gravity at 25° C. about 50 to about 70 percent.

2. The wedge of claim 1 prepared by reacting, in a suitable mold, (A) about 30 to about 50 parts by weight of a quasi-prepolymer having about 15 to about 25 weight percent free NCO which has been prepared by reacting a diisocyanate with at least one polyol selected from at least one of tripropylene glycol, polyester polyol with a hydroxyl functionality of about 2 and a molecular weight in the range of about 1000 to about 2000, polytetramethylene ether glycol having a molecular weight in the range of about 1000 to about 2000, and a triol capped polyalkylene ether polyol having hydroxyl functionality in the range of about 2.5 to about 2.9, and a molecular weight in the range of about 3000 to about 6000, said triol containing 4 to 8 carbon atoms and said polyalkylene ether polyol derived from alkylene oxides or glycols containing 2 to 4 carbon atoms with (B) 100 parts by weight of a mixture comprised of (1) about 90 to about 98 weight percent of at least one polymeric polyol selected from at least one of polyester polyol having a hydroxyl functionality of about 2 and a molecular weight in the range of about 1000 to about 2000 polytetramethylene ether glycol having a molecular weight in the range of about 1000 to about 2000 and triol capped polyalkylene ether polyol having a hydroxyl functionality in the range of about 2.5 about 2.9, and a molecular weight in the range of about 3000 to about 6000, said triol containing 4 to 8 carbon atoms and said polyalkylene ether polyol derived alkylene oxides or glycols containing 2 to 4 carbon atoms, (2) about 2 to about 10 weight percent of a hydroxyl terminated monomeric diol selected from at least one of ethylene glycol, 1,4-butane diol, diethylene glycol, 1,3-propane diol, 1,5-pentane diol, 1,6-hexane diol, β-hydroxyl ethyl-β-hydroxylethyl carbamate, and dipropylene glycol, where the ratio of hydroxyl groups of the polymeric polyol and monomeric diol mixture to free NCO of the quasi prepolymer is in the range of 0.5/1 to about 1.5/1.

3. The wedge of claim 2 where said blowing agent is comprised of at least one of methylene chloride, trichloromonofluoromethane, dichlorodifluoromethane, and 1,2-dichlorotetrafluoroethane, optionally containing a small amount of water.

4. The wedge of claim 3 where said capped polyether polyols are prepared by polymerizing or copolymerizing ethylene oxide and/or propylene oxide with a triol initiator selected from at least one of glycerine and trimethylol propane, where said polyester polyols are the product of reacting at least one dicarboxylic acid having 4 to 10 carbon atoms with a hydroxyl terminated hydrocarbon diol having 2 to 8 carbon atoms and where said diisocyanate is selected from at least one of diphenylmethane-4,4'-diisocyanate, the 2,4- and 2,6-diisocyanates and their mixtures, 3,3'-bitolylene-4,4-diisocyanate, isophorone diisocyanate, 3,3'-dimethyldiphenylmethane-4,4'-diisocyanate, 1,5-naphtylene diisocyanate.

5. The wedge of claim 4 where said polyester polyol is a product of at least one of adipic acid and azalaic acid with at least one of ethylene glycol and 1,4-butane diol and where said diisocyanate is diphenylmethane-4,4'-diisocyanate.

6. The wedge of claim 3 where said fabric is an open weave textile fabric of at least one of linear polyamides, polyaramides, linear polyesters, cotton, rayon, wire and glass.

7. the wedge of claim 2 where, along with the (B) components, an organotin or tertiary amine catalyst is used.

8. The wedge of claim 2, suitable for use in a tire bead assembly preparation apparatus, where the bead assembly is comprised of an annular, inextensible wire bead, an annular triangular cross-sectioned rubber apex, and an annular, relatively flat rubber gum strip, where the said bead assembly is prepared by the method which comprises (A) positioning the wedge between two collapsed, inflatable bladders with its trunk and throat portions fitting therebetween, its trunk portion affixed to a rigid support and its head portion overlapping the bladders to form a continuous outer surface, (B) applying a flat, annular compounded rubber gum strip circumferentially over the outer surface of the head of the wedge, and overlapping the bladders, (C) forcibly positioning an annular, inextensible bead against the said gum strip to force an indentation thereof and a corresponding partial compression of the said wedge, (D) positioning an annular, generally triangular cross-sectioned compounded rubber apex with its base pressed against the positioned bead, and (E) inflating the collapsed bladders to cause their expansion and corresponding shaping the gum strip around the bead and overlapping the sides of the apex adjacent to its base and thereby form the said bead assembly.

9. The wedge according to claim 2 where the plane of its head portion is inclined about 110° to about 135° to the general plane of its trunk portion.

10. The wedge of claim 8 where its microcellular polyurethane has sufficient strength to flex in the range of 100,000 to 200,000 cycles before failure according to ASTM test #D-1052-55 and where said textile fabric strip is an open weave textile fabric integral with an extending from the trunk through the throat to the head of the compressible wedge leaving the outer surface of the head of the wedge compressible.

* * * * *